United States Patent Office 3,308,435
Patented Mar. 7, 1967

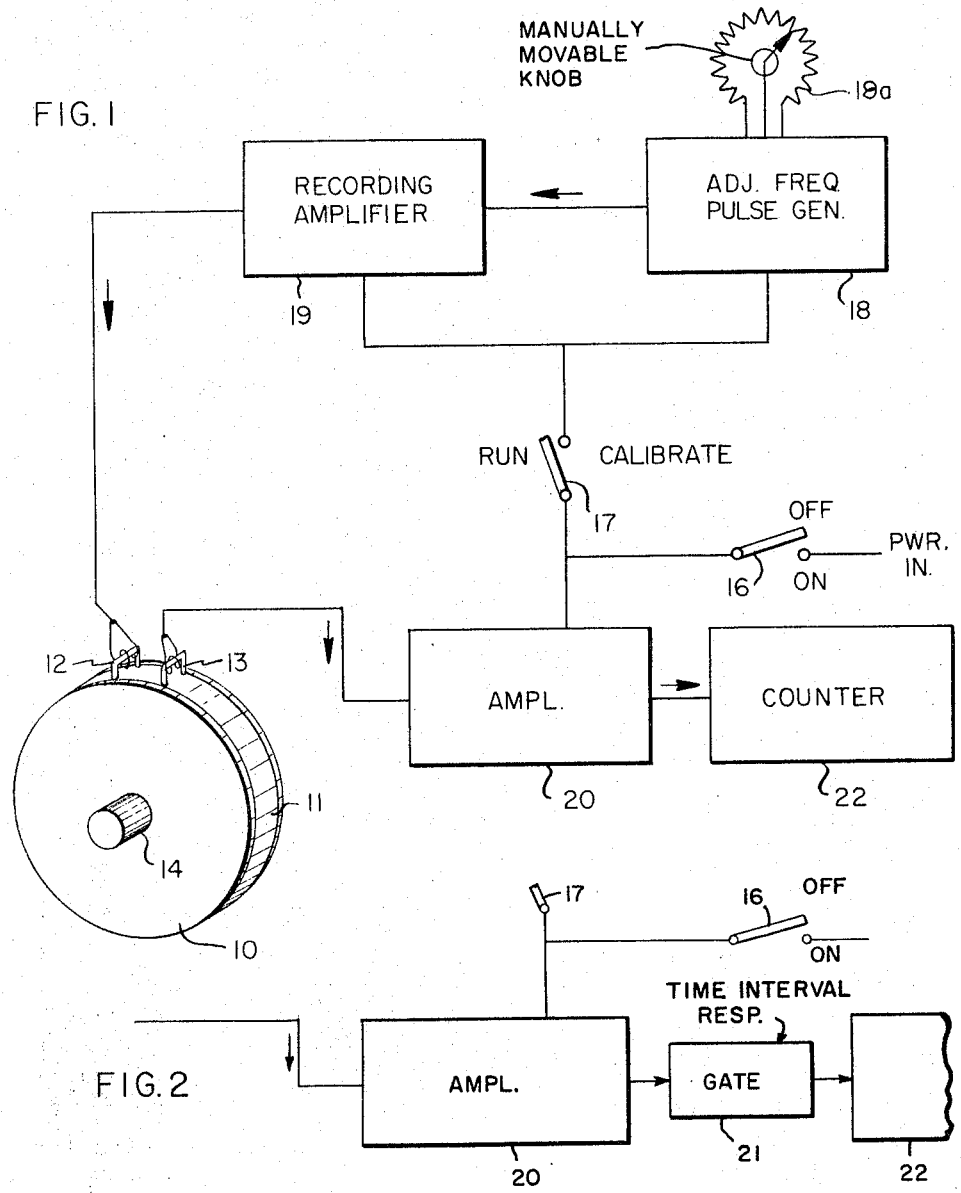

3,308,435
CONTROL FOR COUNTING MECHANISM
Lambert Haner, Rocky River, and Leonard H. Brown, University Heights, Ohio, assignors to Avtron Manufacturing Inc., Cleveland, Ohio, a corporation of Ohio
Filed Jan. 5, 1962, Ser. No. 164,505
4 Claims. (Cl. 340—168)

The present invention relates to an electric control scheme believed to have particular significance in connection with mechanism for counting.

Heretofore known have been pulse transducers using a magnetic pickup or a photocell to generate pulses responsive to rotary movement of gear teeth or slots in a rotating disc. In some applications the fact that such transducers give a fixed number of pulses per revolution has been disadvantageous. Heretofore correction could not readily be made to make such equipment universal. Suppose, for example, that the rotation is derived from an ordinary process roller contacting linearly moving steel (or paper, etc.) strip, linear lengths of which are to be measured. The producer of the transducer could not, in the past, supply standarized "off-the-shelf" equipment at low cost while still useable with various sized rollers owned by his various customers, and, in the past, any ultimate user has found is extremely difficult to properly re-calibrate after the roller wears during use or is ground down as an ordinary maintenance step.

It is an object of the present invention to provide simple means for overcoming the above mentioned difficulties.

Another object of the invention is to provide counting mechanism in which close tolerances can be maintained to provide highly accurate measurements with minimal supervision.

Another object of the invention is to provide a rotary pulse transducer which is unusually compact but in which the pulses per revolution may be varied easily and quickly even by non-skilled personnel.

In accordance with one aspect of the invention an adjustable frequency generator is periodically used to feed a recording head (e.g., while the generator is being and after it is adjusted). The recording head records the signal on a magnetic tape on a wheel driven by apparatus the revolutions of which, when properly calibrated by the equipment plus or minus, are to be counted. When responsive to signal from the adjustable frequency generator, signals are recorded on the magnetic tape wheel, a playback head is used to sense these recorded signals and feed them to a counter.

Other objects and advantages will become apparent and the invention may be better understood from consideration of the following description taken in connection with the accompanying drawing, in which:

FIG. 1 is a simplified one line diagram of apparatus according to the invention; and FIG. 2 illustrates a modification for a portion of the circuit of FIG. 1.

Referring now to the drawing, a wheel 10 carries a continuous band of magnetic recording tape 11 cooperable with a recording head 12 and pickup head 13. As is conventional, an erase feature may be incorporated in the recording head 12, or a separate erase head (not shown) may be used at proper times. Let it be assumed that the tape wheel 10 and its shaft 14 are driven by a roller or friction disc (not shown) responsive to travel of a strip. As shown in the drawing when a supply switch 16 is closed power is taken to a switch 17, and when 17 is in the "Calibrate" (closed) position power is fed to a signal generator 18 which has a rate or frequency adjustment feature provided as by voltage divider 18a. Signals take the direction indicated by the arrows in the drawing, and the adjustable frequency generator supplies signals (e.g., pulses, alternations, or whatever) to a recording amplifier 19 which in turn feeds recording head 12 to record signals (preferably responsive to pulses) on the magnetic tape 11. With rotation of 14 and 11 these signals are picked up by the head 13 and supplied to a pre-amplifier 20. The pre-amplifier, or amplifier might be a better word for 20 if no further amplification is needed, energizes a counting means 22 which can be of any known type (for example having decade counting tubes). If desired, a time interval responsive gate 21 can be inserted, as in FIG. 2 between amplifier and counter, or incorporated within the counter to determine when the counting starts and stops, but with or without thus establishing unit time the counter operates responsive to amplifier 20 to provide a readout. By the term "readout" we mean to include either visual display of numeral indication (as by lights) or further control (for example, strip shearing, feed chute lowering, packaging machine starting, or whatever), or both.

In operation, after the tape wheel 10 is running, e.g., due to lateral movement of a strip or belt, the switch 17 is thrown to "Calibrate" and by means of adjustment of the adjustable frequency generator proper signals are recorded on the tape wheel. Meanwhile the playback head, through the pre-amplifier and counter, simultaneously produces the count for the particular rate to which the pulse generator is adjusted at any moment. Typically, a supervisor can readily adjust the generator to provide proper pulse (or other) signal at any given speed of the tape, and as soon as he removes the "Calibrate" energization the counter will automatically read linear strip travel (or whatever) even if the strip is slowed down or speeded up. As the driving disc or roller wears, or if it is replaced, the supervisor merely recloses the calibrate switch and adjusts the pulse generator, but between adjustments the switch 17 is thrown to the "Run" (Off) position and drive speed and pre-recorded pulses cooperate to determine the readout count.

Within the spirit of the invention other arrangements could be used instead. The position of the calibrating switch could be changed from the "power" line shown to one of the "signal" lines affecting recording head 12 or such a switch could be eliminated by merely turning down the gain of the recording amplifier 19 to such a point that it becomes ineffectual to cause the head 12 to record any new signals on the tape 11 during "Run," while, during "Calibrating" the operator turns up the gain, observes the display, decides if the count is high or low, and adjusts the pulse generator accordingly.

Advantages of the arrangement include the fact that the recording of variable rate signals is easy, quick, permanent for as long as desired, and still changeable, and, unlike any variable speed ratio gearing as known in the prior art, inexpensive to make and to install and convenient for factory personnel to adjust.

While we have illustrated and described a particular embodiment, various modifications may obviously be made without departing from the true spirit and scope of the invention which we intend to have defined only by the appended claims taken with all reasonable equivalents.

We claim:
1. Counting mechanism comprising
a mechanically driven member,
a recording medium carried by said member,
signal recording means cooperable with said medium for recording signals thereon,
a periodic signal source arranged for energizing said recording means,
a pickup means arranged to reproduce recorded signals by cooperation with said medium, a counting means arranged to be energized from said pickup means and afford a readout, and means for adjusting the frequency of the signal from the source.

2. Counting mechanism as in claim 1 further characterized by means for selectively energizing or not energizing the recording head from the pulse source while the counting means remains cooperable with the pickup head.

3. Counting mechanism as in claim 2 further characterized by a recording amplifier interposed between signal source and recording means, and the combination of a pickup amplifier, and
a time interval responsive gate, said combination of pickup amplifier and time interval responsive gate being interposed between pickup head and counting means.

4. Counting means as in claim 1 further characterized by the means for adjusting frequency comprising a manually movable knob.

References Cited by the Examiner

UNITED STATES PATENTS

| 2,970,302 | 1/1961 | Gridley | 340—271 |
| 2,983,867 | 5/1961 | Sperry | 324—70 |
| 3,041,585 | 6/1962 | Wolfe | 340—174.1 |

NEIL C. READ, *Primary Examiner.*

L. A. HOFFMAN, A. W. WARING,
*Assistant Examiners.*